United States Patent Office 3,485,799
Patented Dec. 23, 1969

3,485,799
OXYMETHYLENE POLYMER CONTAINING A
MODIFYING COMPONENT
Im Keun Park, Springfield Township, Union County, N.J., assignor to Carl Freudenberg, Weinheim an der Bergstrasse, a corporation of Germany
No Drawing. Filed Apr. 1, 1966, Ser. No. 539,304
Int. Cl. C08g 1/22
U.S. Cl. 260—67
8 Claims

ABSTRACT OF THE DISCLOSURE

Compositions comprising a thermally stable oxymethylene polymer modified by the inclusion therewith of either pyridine; trioxane; 1,4 - dioxane; 1H,1H,5H-octafluoro-1-pentanol; n-butanol; benzyl alcohol; aqueous solution of sodium carbonate; oxymethylene glycols having between 1 and 20 oxymethylene groups; or oxyethylene glycols having between 1 and 20 oxyethylene groups are disclosed. Articles, e.g., bottles, molded from these compositions exhibit improved impact resistance as compared to ones molded from the unmodified polymer.

The present invention relates to oxymethylene polymers, and, more particularly, to oxymethylene polymers which are modified in order to improve the impact strength of the polymer.

Oxymethylene polymers having successive oxymethylene groups can be prepared by the polymerization of trioxane or formaldehyde. These polymers, which are normally thermoplastic materials, have a unique combination of stiffness, toughness, and inertness and as a result, have achieved widespread use in molded and extruded objects. For some applications, however, it is desirable that the polymer have a higher impact strength than the unmodified polymer. A typical example of such an application is a molded bottle. When such a container is filled with liquid and dropped, the container is subjected to high tensile stress. Materials having high tensile-impact strengths show good resistance to cracking under such circumstances. The tensile-impact strength is normally defined as the amount of energy required per unit cross-sectional area to rupture the specimen at a high rate of elongation. Similarly, in certain extruded objects such as pipe and tubing, resistance to impact cracking from external blows is very desirable.

Accordingly, the primary object of the present invention is to provide an oxymethylene polymer composition having improved impact strength. Other objects will appear hereinafter.

The objects of the present invention are accomplished by the composition comprising an oxymethylene polymer having incorporated therein up to the equilibrium absorption amount of a modifying component selected from the group consisting of pyridine; trioxane; 1,4-dioxane; 1H, 1H,5H-octafluoro-1-pentanol; n-butanol; benzyl alcohol; aqueous solution of sodium carbonate; oxymethylene glycols having between 1 and 20 oxymethylene groups; and oxyethylene glycols having between 1 and 20 oxyethylene groups. It has been found that the addition of the above modifying components to the oxymethylene polymer improves the impact strength of the polymer.

The term "equilibrium absorption amount" is defined as the maximum amount of a material which can be absorbed by another material, and this amount will normally be different for each component being absorbed. For example, the equilibrium absorption amount of pyridine which can be added to an oxymethylene polymer may be 4.8 weight percent, based on the weight of the polymer, for trioxane, 11.0 weight percent, and for 1,4-dioxane, 7.7 weight percent.

Any amount of the modifying components up to the equilibrium absorption amount can be added to the oxymethylene polymer and achieve an improved impact strength for the polymer. The higher the amount of the modifier which is added to the oxymethylene polymer, up to the equilibrium absorption amount, the higher the value of the impact strength for the modified polymer.

It is important to realize that not all material will be absorbed by oxymethylene polymers. Further, not all materials which can be absorbed by oxymethylene polymers will yield improved impact strength values. Some materials absorbed by oxymethylene polymers reduce the impact strength values. Only the above-mentioned modifying components were found to be absorbed by oxymethylene polymers and to cause improvement in the impact strength value of the polymer without degrading the polymer.

The equilibrium absorption amount of the above modifying components may be incorporated in or added to the oxymethylene polymer by any suitable mixing means used by those skilled in the art. For example, the incorporation may be accomplished by first melting the polymer, adding the modifying component in liquid form thereto, and mixing the materials (under pressure if necessary) so as to form a homogeneous blend, commonly referred to as melt blending. The polymer composition or blend may then be extruded in the conventional manner and pelletized for ease in handling in subsequent molding operations. Preferably, however, the solid oxymethylene polymer is soaked in a liquid bath of the modifying component, whereby the polymer will absorb the modifier. The liquid bath is normally maintained at any convenient temperature sufficient to maintain the modifying component as a liquid. For the above mentioned modifying components, temperatures below about 100° C. will usually be suitable for the soaking bath. Oxymethylene polymers do not normally become molten below about 160° C., therefore, soaking temperatures above 100° C. may be used if so desired, using pressure if necessary to maintain the modifier in liquid form.

It is desirable to include at least 0.5 percent, preferably more than 2 percent by weight, of the modifier in the polymer.

The term "oxymethylene polymers" as used herein, relates to those polymers having recurring oxymethylene units and may be prepared by the polymerization of formaldehyde or trioxane, a cyclic trimer of formaldehyde. Suitable oxymethylene polymers include oxymethylene homopolymers and copolymers. Preferred oxymethylene copolymers are those containing recurring oxymethylene units interspersed with —OR— groups in the main polymer chain, where R is a divalent radical containing at least two carbon atoms directly linked to each other and positioned in the polymer chain between the two valences, with any substituents on said R radical being inert, that is, those which are free of interfering functional groups and do not induce undesirable reactions under the conditions involved. Particularly preferred are copolymers which contain from 60 to 99.6 mol percent of recurring oxymethylene groups and from 0.4 to about 40 mol percent of —OR— group. Most preferred are those polymers having from 85 percent to 99.6 mol percent of recurring oxymethylene groups and from 0.4 to 15 mol percent of —OR—groups. In a preferred embodiment R may be, for example, an alkylene or substituted alkylene group containing at least two carbon atoms.

Among the oxymethylene copolymers which may be utilized in accordance with this aspect of the invention are those having a structure comprising recurring units having the formula

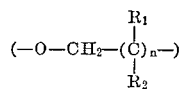

wherein $n$ is an integer from zero to 5 and wherein $n$ is zero in from 60 to 99.6 mol percent of the recurring units. $R_1$ and $R_2$ are inert substituents, that is, substituents which are free of interfering functional groups and will not induce undesirable reactions.

A preferred class of oxymethylene copolymers are those having a structure comprising oxymethylene and oxyethylene recurring units wherein from 60 to 99.6 mol percent of the recurring units are oxymethylene units.

Particularly preferred oxymethylene polymers are those having incorporated therein oxyalkylene units having adjacent carbon atoms which are derived from cyclic ethers having adjacent carbon atoms. These copolymers may be prepared by copolymerizing trioxane or formaldehyde with a cyclic ether having the structure

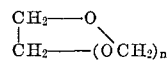

where $n$ is an integer from zero to 2.

Examples of preferred oxymethylene polymers include copolymers of trioxane and cyclic ethers containing at least two adjacent carbon atoms such as the copolymers disclosed in U.S. Patent No. 3,027,352 by Cheves T. Walling, Frank Brown and Kenneth W. Bartz, assigned to the Celanese Corporation of America.

Among the specific cyclic ethers which may be used are ethylene oxide; 1,3-dioxolane; 1,3,5-trioxepane; 1,4-dioxane; trimethylene oxide pentamethylene oxide 1,2-propylene oxide; 1,2-butylene oxide; neopentyl formal; pentaerythritol diformal; paraldehyde; tetrahydrofuran and butadiene monoxide.

As used in the present invention, the term "oxymethylene" includes substituted oxymethylene, where the substituents are inert with respect to the reactions in question, that is, the substituents are free of interfering functional groups and will not introduce undesirable reactions.

As used in the present invention, the term "copolymer" means polymers having two or more monomeric groups, including terpolymers and higher polymers. Suitable oxymethylene terpolymers include those disclosed in abandoned U.S. Patent Application Ser. No. 229,715, filed Oct. 10, 1962, by W. E. Heinz and F. B. McAndrew, which is assigned to the Celanese Corporation of America.

The preferred oxymethylene polymers which are used in the present invention are thermoplastic materials having a melting point of at least 150° C. and are normally millable at a temperature of 200° C. They have a number average molecular weight of at least 10,000. These polymers have a high thermal stability. The preferred oxymethylene polymers which are used herein have an inherent viscosity of at least one (measured at 60° C. in a 0.1 weight percent solution in p-chlorophenol containing 2 weight percent of α-pinene). The preferred oxymethylene copolymers exhibit remarkable alkaline stability. For example, if the chemically stabilized copolymers are refluxed at a temperature of about 142 to 145° C. in a 50 percent solution of sodium hydroxide in water for a period of 45 minutes, the weight of the copolymer will be reduced by less than one percent.

The preferred oxymethylene copolymers are preferably stabilized by degradation of the molecular ends to a point where a stable carbon-to-carbon linkage exists at each end.

Thermal degradation, as disclosed in application Ser. No. 803,562, filed Apr. 2, 1959, now U.S. Patent No. 3,103,499 issued on Sept. 10, 1963 to Thomas J. Dolce and Frank M. Berardinelli, or degradation by hydrolysis, as disclosed in abandoned application Ser. No. 102,097, filed Apr. 11, 1961, by Frank M. Berardinelli, may be used. These applications are assigned to the Celanese Corporation of America.

Other suitable oxymethylene polymers and methods of preparation therefor are disclosed in an article Kern et al., Angewandt Chemie 73(6) 177–186 (Mar. 21, 1961), including polymers containing repeating carbon-to-carbon single bonds in the polymer chain by copolymerizing trioxane with cyclic ethers such as dioxane, lactones such as betapropiolactone, anhydrides such as cyclic adipic anhydride and ethylenically unsaturated compounds such as styrene, vinyl acetate, vinyl methyl ketone, acrolein, etc. Also these and other oxymethylene polymers are disclosed by Sittig in Petroleum Refiner, volume 41, Number 11, November 1962, pages 131 through 170.

In addition to the above-mentioned oxymethylene copolymers, oxymethylene homopolymers of trioxane or formaldehyde may also be used in the present invention. It may be desirable to "end cap" the homopolymer molecules by the known methods of etherification or esterification.

If desired, the oxymethylene polymers may also contain any suitable coloring agents, additives or fillers, including glass, carbon black, titanium dioxide, finely divided copper and the like. In addition, chemical stabilizers such as scission inhibitors, which are well known and frequently used with oxymethylene polymers, may be added.

The present invention is additionally illustrated by the following example.

EXAMPLE

A commercial oxymethylene copolymer of trioxane and ethylene oxide was compression molded at 190° C. to form Type L test specimens according to test procedure ASTM D-1822.

Compounds were incorporated in the test specimens by immersing the specimen in a liquid bath of the compound for a period of time sufficient to cause the polymer to absorb the equilibrium absorption amount of the compound.

Subsequently, the specimens containing the compounds and a control specimen of unmodified copolymer were subjected to tensile impact tests using an Instrumented Tensile Impact Tester as discussed by P. P. Kelly and T. J. Dunn in "Materials Research and Standards," Volume 3, No. 7, page 545, July 1963. The results of the tests are shown in Table I.

TABLE I

| Compound | Equilibrium absorption amount (weight percent, based on the weight of the copolymer) | Tensile impact strength (ft.-lb./in.²)[1] | |
|---|---|---|---|
| | | 23° C. | −45° C. |
| Unmodified copolymer | | 63 | 34 |
| 1,6-hexanediol | 1.5 | 52 | |
| Di-ethanol amine | 1.0 | 57 | |
| Pyridine | 4.8 | 100 | 127 |
| Trioxane | 11.0 | 85 | 44 |
| 1,4-dioxane | 7.7 | 93 | 94 |

[1] A strain rate of 8,100 in./in./min. was used.

The above results clearly illustrate the marked tensile impact strenght improvement obtained with pyridine, trioxane, and 1,4-dioxane. The use of 1,6-hexanediol and diethanol amine actually lowered the tensile impact strength, even though they could be absorbed by the copolymer.

The oxymethylene polymer composition of the present invention is particularly desirable for the fabrication of shaped articles such as filaments, films, sheets, fibers, bristles, pipes, rods, and tubes.

The principle, preferred embodiments, and modes of operation of the present invention have been described in the foregoing specification. However, it should be understood that the invention which is intended to be protected herein, may be practiced otherwise than as described without departing from the scope of the appended claims.

I claim:
1. A solid plastic composition comprising a previously prepared thermally stable oxymethylene copolymer which contains from 60 to 99.6 mol percent of recurring oxymethylene groups and from 0.4 to about 40 mol percent of —OR— groups, wherein R is a divalent radical containing at least two carbon atoms directly linked to each other and positioned in the polymer chain between the two valences, with any substituent on said R radical being inert, and the equilibrium absorption amount of a modifying component to improve the impact strength of said oxymethylene copolymer, said equilibrium absorption amount not to exceed about 11 weight percent of said oxymethylene copolymer and said modifying component being selected from the group consisting of pyridine; trioxane; 1,4-dioxane; 1H,1H,5H-octafluro-1-pentanol; n-butanol; benzyl alcohol, aqueous solution of sodium carbonate; oxymethylene glycols having between 1 and 20 oxymethylene groups; and oxyethylene glycols having between 1 and 20 oxyethylene groups.

2. The composition of claim 1 wherein the oxymethylene copolymer comprises trioxane and ethylene oxide.

3. The composition of claim 1 wherein the modifying component is incorporated in the oxymethylene polymer by melt blending the materials.

4. The composition of claim 1 wherein the modifying component is pyridine and the equilibrium absorption amount is about 4.8 weight percent.

5. The composition of claim 1 wherein the modifying component is trioxane and the equilibrium absorption amount is about 11 weight percent.

6. The composition of claim 1 wherein the modifying component is 1,4-dioxane and the equilibrium absorption amount is about 7.7 weight percent.

7. In a process for making an oxymethylene polymer composition possessing improved impact resistance which comprises immersing a previously prepared thermally stable oxymethylene copolymer in a liquid bath of a modifying component, said oxymethylene copolymer containing from 60 to 99.6 mol percent of recurring oxymethylene groups and from 0.4 to about 40 mol percent of —OR— groups, wherein R is a divalent radical containing at least two carbon atoms directly linked to each other and positioned in the polymer chain between the two valences, with any substituent on said R radical being inert; and said modifying component is selected from the group consisting of pyridine; trioxane; 1,4-dioxane; 1H,1H,5H - octafluoro - 1 - pentanol; n-butanol; benzyl alcohol; aqueous solution of sodium carbonate; oxymethylene glycols having between 1 and 20 oxymethylene groups; and oxyethylene glycols having between 1 and 20 oxyethylene groups; until the copolymer absorbs at least 0.5 percent by weight of the modifying component.

8. A process according to claim 7 wherein the liquid bath of the modifying component is maintained at a temperature below about 100 C.

References Cited

UNITED STATES PATENTS

| | | | |
|---|---|---|---|
| 3,137,669 | 6/1964 | Bragaw | 260—33.4 |
| 2,989,509 | 6/1961 | Hudgin et al. | |
| 3,183,211 | 5/1965 | Brinker et al. | |
| 3,256,246 | 6/1966 | Gutweiler et al. | |
| 3,301,821 | 1/1967 | Asmus et al. | |
| 3,351,614 | 11/1967 | Fiore et al. | |

OTHER REFERENCES

Alsup et al., Journal of Applied Polymer Science, vol. 1 No. 2 (1959) pp. 185–191.

HAROLD D. ANDERSON, Primary Examiner

L. M. PHYNES, Assistant Examiner

U.S. Cl. X.R.

260—29.1, 30.2, 30.4, 33.4

CERTIFICATE OF CORRECTION

Patent No. 3,485,799               Dated December 23, 1969

Inventor(s)   Im Keun Park

It is certified that error appears in the above-identified patent and that said Letters Patent are hereby corrected as shown below:

In the head note the Assignee reading "Carl Freudenberg, Weinheim an der Bergstrasse, a corporation of Germany" should read --Celanese Corporation, a corporation of Delaware--

SIGNED AND
SEALED
JUL 21 1970

(SEAL)
Attest:

Edward M. Fletcher, Jr.
Attesting Officer

WILLIAM E. SCHUYLER, JR.
Commissioner of Patents